Dec. 18, 1962 D. H. PRUTTON 3,068,991
VIBRATORY FEEDER AND ORIENTOR OF ARTICLES SUCH AS SCREW BLANKS
Filed June 5, 1959 4 Sheets-Sheet 1
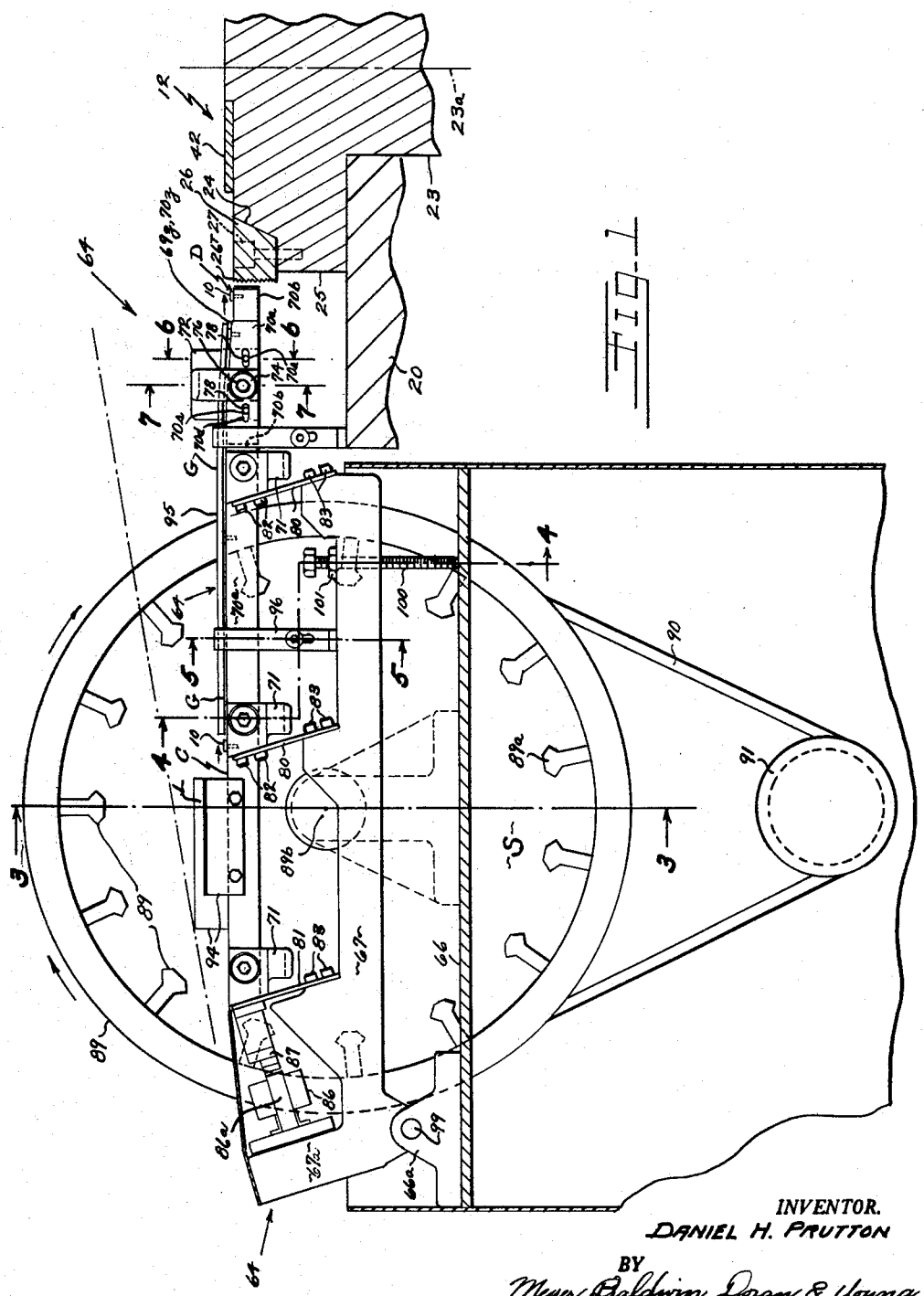
INVENTOR.
DANIEL H. PRUTTON
BY
Meyer, Baldwin, Doran & Young
ATTORNEYS

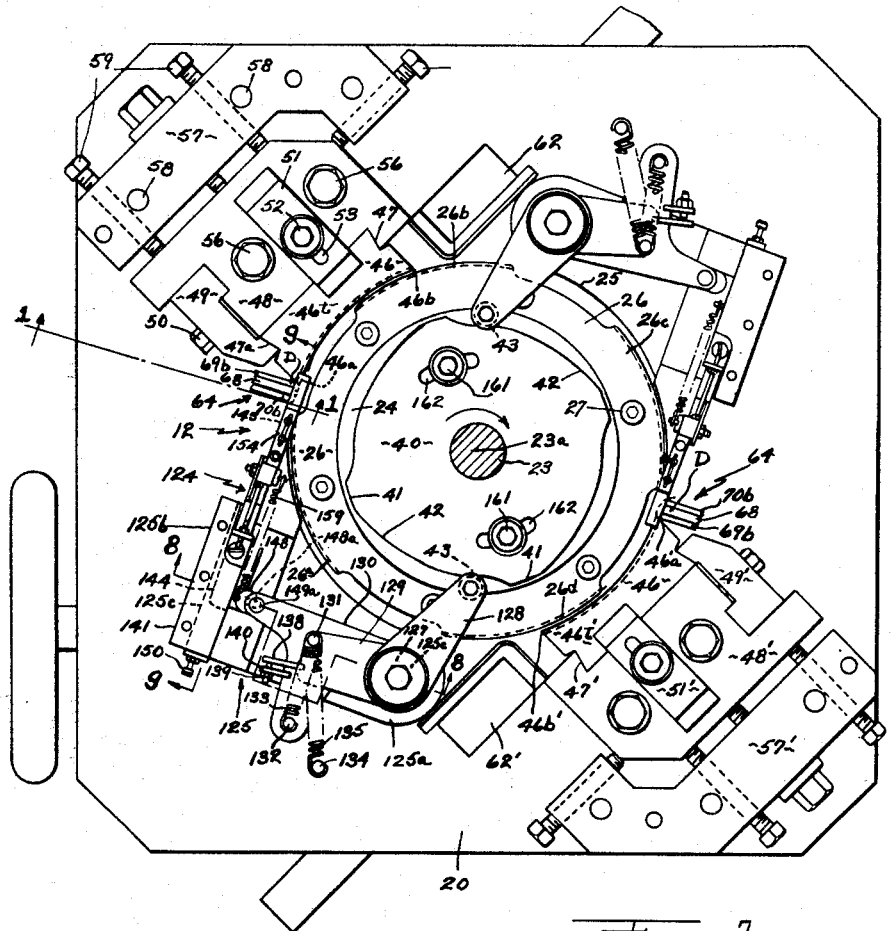

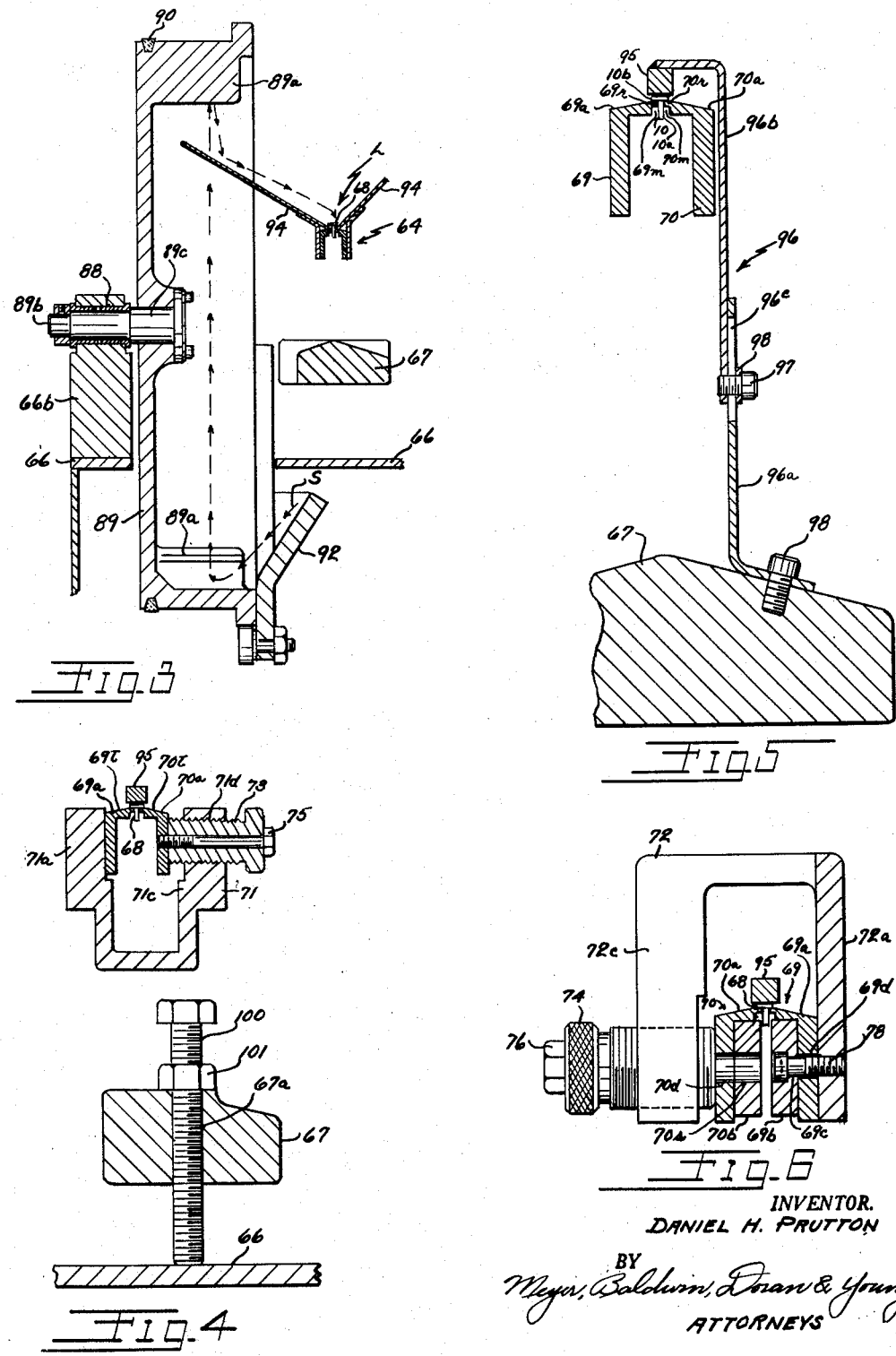

Dec. 18, 1962 D. H. PRUTTON 3,068,991
VIBRATORY FEEDER AND ORIENTOR OF ARTICLES SUCH AS SCREW BLANKS
Filed June 5, 1959 4 Sheets-Sheet 4

INVENTOR.
DANIEL H. PRUTTON
BY
Meyer, Baldwin, Doran & Young
ATTORNEYS

United States Patent Office 3,068,991
Patented Dec. 18, 1962

3,068,991
VIBRATORY FEEDER AND ORIENTOR OF ARTICLES SUCH AS SCREW BLANKS
Daniel H. Prutton, 4134 W. 140th St., Cleveland, Ohio
Filed June 5, 1959, Ser. No. 818,297
2 Claims. (Cl. 198—33)

This invention relates to improvements in an article feeder and more particularly to a feeder of articles (such as screw blanks, nails, or other articles to be form rolled) to a thread or form rolling machine.

This patent application is a continuation-in-part of my copending United States patent application entitled "Machine for Thread Rolling," Serial No. 409,911, now abandoned, filed February 12, 1954, which is a continuation-in-part of my then copending United States patent application entitled "Machine for Thread Rolling," Serial No. 182,726, filed September 1, 1950 and now abandoned.

One of the objects of the present invention is to provide an article vibratory feeder for feeding headed articles with the vibration aiding the feeding action, orientation of the articles, clearing of improperly oriented articles, etc.

A further object of the present invention is to provide an article feeder especially adapted for feeding screw blank articles with said article feeder having parallel rails with an article feeding gap therebetween, means for vibrating at least one of these rails for orientating the articles in the feeding gap and/or feeding the article along the feeding gap, means for clearing improperly orientated articles from the feeding gap, means for individually hanging the articles in the feeding gap to prevent jam up, means for resisting movement of the articles out of the feeding gap by the vibration during the feeding action, means for adjusting the width of the feeding gap, and/or means for adjusting the longitudinal and/or vertical position of the discharge end or position of the feeder so that it can be readily accommodated to different size replaceable dies on a thread rolling machine.

A further object of the present invention is to provide an article feeder characterized by its inexpensive manufacturing cost; ease of assembly of its component parts; structural simplicity; compactness; strong and sturdy nature; operating efficiency; multiplicity of functional advantages for some component parts and/or actions, such as the vibrating action; and/or low operating cost.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 1 is a vertical sectional view taken generally along the line 1—1 of FIG. 2 showing a side elevational view of the article feeder;

FIG. 2 is a top plan view of a planetary type thread rolling machine with only the discharge end or position of each of two such article feeders shown thereon;

FIG. 3 is a vertical sectional view taken generally along the line 3—3 of FIG. 1;

FIG. 4 is a vertical sectional view taken generally along the line 4—4 of FIG. 1;

FIG. 5 is a vertical sectional view taken generally along the line 5—5 in FIG. 1;

FIG. 6 is a vertical sectional view taken generally along the line 6—6 in FIG. 1;

FIG. 7 is a vertical sectional view taken generally along the line 7—7 in FIG. 1;

FIG. 8 is a vertical sectional view taken generally along the line 8—8 in FIG. 2; while

Figure 8:
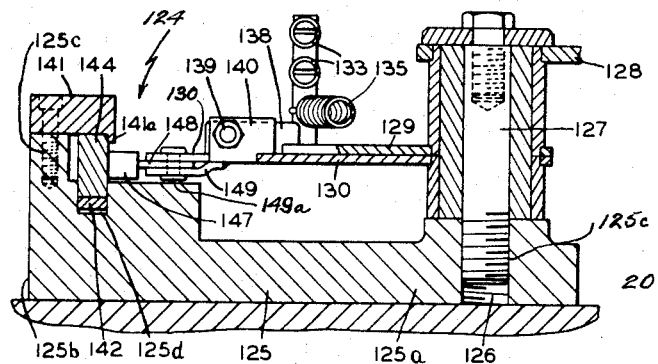

Before the apparatus here illustrated is specifically described, it is to be understood that the invention here involved is not limited to the structural details or arrangement of parts here shown since an apparatus embodying the present invention may take various forms. It also is to be understood that the phraseology or terminology herein employed is for purposes of description and not of limitation since the scope of the present invention is denoted by the appended claims.

The illustrated apparatus is adapted to feed any suitable articles, but it is especially adapted for vibratory feeding and orientating articles, such as screw blanks or nails, for a high speed, thread or form rolling machine in the manner illustrated.

The articles orientated and fed herein take the form of screw blank articles 10 with each including a shank 10a adapted to be threaded by the threading machine disclosed hereinafter, and a head 10b, located at the upper end of shank 10a and of larger cross sectional diametrical dimension than shank 10a.

In FIGS. 1 and 2, a planetary type thread or form rolling machine 12 is provided for rolling threads or other forms on the shanks 10a of articles 10. Machine 12 includes mounting base or table 20. Extending upwardly through the center of table 20 is spindle 23 carrying rigidly therewith tapered hub 24 and annular bottom flange 25 upon which annular die ring 26 is detachably secured by bolts 27 which are threaded into flange 25. The spindle is driven through a conventional transmission by a motor carried on the bottom of table 21 so as to rotate the spindle about its vertical, longitudinal axis 23a in the clockwise direction in FIG. 2.

It will be apparent that the same reference numerals have been used for many of the corresponding parts found in both the present and the copending applications.

Die ring 26 may have a threaded circular periphery or four equally spaced threading die segments 26a, 26b, 26c and 26d in FIG. 2 extending radially outwardly beyond the balance of the circumferential periphery of the die ring. These segments have formed thereon a helical set of crests and grooves equal in pitch and other significant dimensions with the thread to be formed on shank 10a. This ring-like center thread rolling die 26 is rotatable with shaft 23 about axis 23a fixed relative to base 21. Cooperating with these segments on ring-like die 26 are two fixed or outer dies 46 and 46', adjustably attached to the top of frame or table 21 in diametrically opposed relationship and having inner, vertical concave faces, machined to be complementary to the outer convex faces of inner die 26. The outer dies 46 and 46' are similarly positioned and fixed with respect to the inner die 26, and description of die 46 will suffice, attaching to the other the same reference characteristics but with prime designations.

Die 46 detachably interfits at 47 with die holding block 48 and at 47a with clamp finger 49 applied by means of bolt 50, as best seen in FIG. 2. Vertical displacement of die 46 is prevented by clamping bridge 51 retained on block 48 by bolt 52. The bridge is slidable endwise if desired as permitted by a slot 53 in bridge 51 through which the shank of bolt 52 passes. The bolt of course must be slacked off to permit such endwise movement of the bridge. Thus die 46 may be removed and another for rolling the same or different pitch threads replaced without removal of block 48. Block 48 is retained on table 21 by bolts 56 with the shanks of the bolts having limited clearance from the walls of the apertures in block 48 through which they pass to permit minor adjustment of block and die positions before finally tightening bolts 56. Backstop block 57 is attached to table 21 by bolts 58, and is horizontally pierced by threaded abutment bolts 59 which are advanced through several angles to serve both in withstanding the stresses from the threading operation, and in effecting positional adjustment of the die holding block 48 before bolts 56 are tightened down.

Now it should be apparent that dies 26, 46 and 46' are replaceable thread rolling dies so that screw blank articles 10 of different diameter or length of shank 10a or of different thread pitch may be properly screw threaded.

As will later more fully appear, spindle 23, carrying cam 40 and die ring 26, rotates clockwise in FIG. 2; and as the leading corner of the dies 26a and 26b, etc., rotate into registry with the corner 46a of die 46, a blank 10 is introduced therebetween, in vertical position and with its head 10b upwardly, so that continued rotation of die ring 26 grips shank 10a between dies 26a and 46, rolls screw blank article 10 counterclockwise about its own axis and clockwise about the periphery of die ring 26, simultaneously threads the periphery of shank 10a, and ejects finished screw 10 at the moment the trailing corner of die 26a passes corner 46b. The threaded article or screw 10 drops into chute 62, and passes downwardly and outwardly through table or frame 20.

Here, articles 10 are fed sequentially to thread rolling machine 12 by two feeders 64 with one feeding the articles to die edge 46a in FIG. 2 and the other feeding articles to die edge 46a' in FIG. 2.

Since each feeder 64 is identical, only one will be described, and this is shown in FIG. 1 as feeding articles 10 from left to right. Here, mounting base 66 is secured to, or formed integrally with, mounting base or table 20 so as to be fixed thereto. Feeder 64 has a feeder base 67 of generally L-shaped form upon which is supported two parallel feed rails 69 and 70 in FIG. 5 having a feeding gap 68 therebetween wider than each article shank 10a but narrower than article head 10b to support each article 10 by its head 10b during feeding along gap 68 in the direction of the arrows in FIG. 1. Rails 69 and 70 include respectively rail portions 69a and 69b and rail portions 70a and 70b with these portions respectively laterally aligned and being mirror images of each other.

These rail portions are secured together and the width of feeding gap 68 is maintained uniform along its length by U-shaped brackets 71 and 72 spaced along the length of rails 69 and 70.

Each U-shaped bracket 71 is secured to rail portions 69a and 70a in the manner shown in FIG. 4. Rail portion 69a is welded or otherwise secured to arm 71a of bracket 71. Threaded sleeve bolt 73 has exterior threads screwed into a threaded hole 71d in arm 71c of bracket 71 so that the left end of sleeve bolt 73 in FIG. 4 bears against the outer surface of rail portion 70a, and rail portion 70a is pulled against this left end of sleeve bolt 73 by bolt 75 extending through the bore in sleeve bolt 73 and threaded into a hole in rail portion 70a.

In FIGS. 6 and 7, the rail portions are similarly secured to U-shaped bracket 72. Rail portions 69a and 69b are pulled against arm 72a of U-shaped bracket 72 in FIG. 6 by two bolts 78 with each bolt screwed into a threaded hole in arm 72a and extending through a hole 69c in rail portions 69b and through horizontally elongated slot 69d in rail portion 69a so that the head of bolt 78 pulls these rail portions against arm 72a. In FIG. 7, threaded sleeve bolt 74 locates rail portion 70a by the left end of sleeve bolt 74 since the peripheral threads on sleeve bolt 74 are screwed into threaded hole 72d in arm 72c of bracket 72. Rail portion 70b is pulled against the inner surface of rail portion 70a to the position shown in FIG. 7 and the rail portion 70a is pulled against the left end of sleeve bolt 74 by bolt 76 extending through the bore in sleeve bolt 74, a horizontally elongated slot 70d in rail portion 70a, and screwed into a threaded hole 70c in rail portion 70b.

Suitable rail vibrating means is provided for vibrating rails 69 and 70, or at least a portion of one of the rails, with this vibration being generally longitudinally along the length of feeding gap 68 so as to feed articles 10 along this gap in the direction of the arrows in FIG. 1. Here, suitable resilient means operatively connect rails 69 and 70 with feeder base 67 with this resilient means specifically shown herein as a plurality of leaf springs 80 and 81, here three in number, spaced along the length of these rails and connected at opposite ends to the rails and the feeder base. Each of the two leaf springs 80 has a U-shaped slot in its upper end straddling rails 69 and 70 with the spring portions on the sides of each slot generally coinciding with arms 71a and 71c in FIG. 4 so as to be secured thereto by screws 82. The upper end of spring 81 is secured to the back side of the leftmost bracket 71 in any suitable manner, such as by welding. The lower ends of each of the springs 80 and 81 are secured by screws 83 to feeder base 67. These flat springs 80 and 81 form the sole support for rails 69 and 70, which are free to vibrate in a generally longitudinal direction. The preferred angle between each spring 80 or 81 and rails 69 and 70 is shown in FIG. 1 so as to provide the proper type vibration.

This rail vibrating means also includes an electromagnetic coil 86 secured to upwardly extending arm 67a of feeder base 67 and adapted to attract an armature 87 secured to the upper end of spring 81 and to the left end of rails 69 and 70 in FIG. 1. Armature or pole piece 87 and core 86a of coil 86 are each made of iron or other magnetizable material. Then, when coil 86 is energized, it will pull armature 87 and rails 69 and 70 toward the left in FIG. 1. When coil 86 is deenergized, springs 80 and 81 will move rails 69 and 70 toward the right in FIG. 1 back to their illustrated position. Hence, when coil 86 is periodically energized, such as by an alternating current, it serves as a force applying means for exerting a periodic, generally endwise force (directed toward the left in FIG. 1) on rails 69 and 70 to move these rails from the illustrated position to a left hand position against the bias of springs 80 and 81; and upon periodic release of this force by deenergizing coil 86, springs 80 and 81 move rails 69 and 70 back to the illustrated position in FIG. 1. If a source of alternating current is applied to coil 86, such as 60 cycle alternating current, articles 10 will be fed along rails 69 and 70 through gap 68 in the direction of the arrows in FIG. 1 toward discharge position D. It should be noted that feeder base 67 does not vibrate with rails 69 and 70.

Suitable feeder loading means may be provided for feeding articles 10 from supply S in FIGS. 1 and 3, in an upward direction in FIG. 3, and then in a downward direction onto feeding gap 68, in the manner shown by the arrows in FIG. 3, at a loading position L so that gravity and the aforedescribed vibration promote dropping of shanks 10a of articles 10 into feeding gap 68 to properly orient these articles in this gap. Here, a barrel-type article pick-up 89 in FIGS. 1 and 3, also called an elevating hopper barrel, is rotatably mounted on axis 89b by shaft 89c, secured to barrel 89, rotatable in bearing 88 in bracket 66b of base 66; and is rotatably driven about horizontal axis 89b by a suitable motor driving through a speed reducer pulley 91 in FIG. 1 to drive barrel 89 by belt 90. The inwardly, radially extending fins 89a of barrel 89 pick-up articles 10 from supply S, taking the form of a dead bin having one wall formed by stationary wall 92 in FIG. 3 (omitted in FIG. 1 for clarity) and the other wall formed by the lower portion of barrel 89. Fins 89a elevate articles 10 in the direction of the arrows in FIG. 3 so as to drop them at the upper end of their travel in the clockwise direction in FIG. 1 down onto V-shaped trough 94 in FIGS. 1 and 3 with this trough having its lower, discharge end straddling feeding gap 68 so as to funnel articles 10 in this trough into this gap. The opposite walls of trough 94 are secured to the rails 69 and 70, as shown in FIG. 3.

The vibration caused by electromagnetic coil 86, and by springs 80 and 81, provide several advantageous features. First, the vibration feeds the articles 10 along the length of feeding gap 68 in the direction of the arrows from left to right in FIG. 1. As coil 86 is supplied with a suitable electric current, such as 60 cycle alternating current, there will be produced a rapid pulsation in the magnetic flux in its core 86a so as to attract and release pole or armature 87 in rapid succession so that rails 69 and 70 will vibrate in a generally longitudinal direction under the combined influence of springs 80 and 81 and of electromagnetic coil 86. The articles 10 in feeding gap 68 will be conveyed toward the right in the direction of the arrows in FIG. 1. This article conveyance is believed to be due in part to the angular arrangement of springs 80 and 81 with respect to rails 69 and 70, which angular arrangement causes the forward movement of rails 69 and 70 to be slightly upwardly toward articles 10 in gap 68, and the rearward movements to be slightly downwardly and away from the articles 10. The feeding action may also be due in part to the fact that the rearward movements toward the left in FIG. 1 are more rapid than the forward movements toward the right since these rearward movements are brought about by the force of electromagnetic coil 86 pulling against the springs while the forward movements are brought about by the springs 80 and 81 alone. The inertia of articles 10 also apparently prevents them from following the rapid rearward movements while allowing them to follow the slower forward movements. It has been found in practice that articles 10 will feed in the direction of the arrows in FIG. 1 along or through gap 68 even though rails 69 and 70 may be tilted up to a 15 degree angle, as shown by the dot-dash line in FIG. 1.

Second, the vibration orients articles 10 so as to place them down into feeding gap 68 with shank 10a downwardly with head 10b supported by rails 69 and 70 so as to be in proper position for thread rolling by thread rolling machine 12.

Third, the vibration also causes more of the articles 10 in V-shaped trough 94 to fall shank downwardly into the feeding gap 68 than would occur if no vibration were used.

Fourth, vibration causes feeder 64 to be self clearing and to prevent overloading of feeding gap 68. No clearing wheel is required with this construction. In clearing zone C in FIG. 1, top surfaces 69t and 70t of rail portions 69a and 70a, as seen in FIG. 4, are downwardly and outwardly tapered for clearing these rails of any article 10 not adapted to move into feeding position in feeding gap 68. These surfaces 69t and 70t are in clearing position C spaced toward discharge position D in FIG. 1 from trough 94.

As these articles 10 move from clearing position C toward discharge position D, they travel through guided position G in FIG. 1. Here, top rail or guide 95 is stationary, does not vibrate, and is located above feeding gap 68 between positions C and D for coacting during feeding with article heads 10b on the articles in feeding gap 68. Its purpose is to hold articles 10 in gap 68, in spite of the vibration, while they travel along gap 68 and to force these articles to stay in this gap and on the track or chute provided by rails 69 and 70. As rails 69 and 70 vibrate longitudinally, guide or top rail 95 remains stationary. This top rail 95 is vertically adjustably supported in proper location by two support brackets 96 with each including in FIGS. 1 and 5 a base portion 96a and a top portion 96b. The upper end of portion 96b is welded or otherwise secured to guide rail 95. The lower end of portion 96a is secured by screw 98 to the top of feeder base 67 or table 20. Portions 96 and 97 are secured together for adjustable, vertical movement by screw 97 and washer 98 with the threaded shank of screw 97 extending through a vertically elongated slot 96c in portion 96a and screwed into a threaded hole in portion 96b.

Rails 69 and 70 are constructed so as to prevent articles 10 from crossing or jamming in gap 68, to help make feeding gap 68 self clearing, and to hang each article 10 individually by gravity from rails 69 and 70 by its article head 10b. Each rail 69 and 70 has on rail portions 69a and 70a respectively lips 69r and 70r for supporting each article head 10b. Each of these lips is thin along the axial length of the article shanks 10a, as shown in FIGS. 3, 5 and 6, in feeding gap 68 and these rails are undercut at 69m and 70m away from shanks 10a below lips 69r and 70r so that these advantages are obtained by the clearance provided by this structure.

Suitable means is provided for adjustably mounting rails 69 and 70 for relative lateral movement of these rails so that the width of feeding gap 68 may be changed along its length to accommodate screw blank articles 10 of different diameter shank 10a. If the hexagonal heads of bolts 75 and 76 in FIGS. 4 and 7 are loosened, threaded sleeve bolts 73 and 74 may be screwed outwardly or inwardly in their respective threaded screw holes 71d and 72d so as to move rail 70 away from or toward rail 69. Then, when feeding gap 68 is of proper width, bolts 75 and 76 may be tightened again to lock this width adjustment.

It may be desirable to move the discharge end or position D of feeding gap 68 vertically in FIG. 1 relative to base 20 so that this end D and article head 10b will be at proper position with respect to the top surfaces 26t, 46t and 46t' of dies 26, 46 and 46'. Some of these dies may vary in axial thickness, and the axial thickness of some of these dies is determined by whether the screw blanks have shanks 10a of long or short axial dimension. Hence, this vertical adjustment of discharge end or position D permits the machine to roll threads on screw blanks with either short or long shanks 10a. Here means is provided for adjustably mounting this discharge position D of rails 69 and 70 for vertical movement relative to base 20 so that the discharge position D may be at proper height even though the tops 26t, 46t or 46t' of replaceable dies 26, 46 or 46' may be of different height for different screw shank lengths. The tops of dies 46 and 46' will be generally the same height as top 26t so as to be horizontally aligned therewith under article head 10b. Here, feeder base 67 is secured by its pivot pin 99 (FIG. 1) to a lug 66a of mounting base 66 to permit relative movement of feeder base 67 with respect to mounting base 66 about the horizontal axis of this pin a spaced distance from discharge position D so that this position D may be moved toward or away from base 20 to provide this desired vertical adjustment. A vertically extending adjustment screw 100 in FIGS. 1 and 4 is located between pivot pin 99 and discharge position D in FIG. 1 (between discharge end D in FIG. 1 and the center of gravity of feeder 64 about pivot 99) so as to serve as an adjustable means for maintaining bases 66 and 67 in any desired adjustment. Screw 100 is screwed into a threaded hole 67a in feeder base 67 and has its lower end bearing against the top of base 66 so that rotation of this screw 100 in one of its opposite directions will either elevate or lower the feeding track provided by rails 69 and 70 and the discharge position D. Any position may be locked by turning lock nut 101 on screw 100 against base 67. This construction permits the discharge end or position D in FIG. 1 to move vertically relative to base 20 so that it will be always at proper height even though the top surfaces 26t, 46t and 46t' of the replaceable dies may be of different heights for different screw shank lengths. Proper feeding of articles 10 will occur even if rails 69 and 70 are inclined uphill, as shown by the dot-dash line in FIG. 1, with the maximum inclination angle being dependent on the friction between parts 10 and rails 69 and 70. Under some conditions, even a 15 degree uphill inclination will still provide satisfactory feeding.

When shanks 10a are of different diameters or have different thread pitches rolled thereon, the replaceable ring-like dies 26, used for these different sizes, may be of different outside diameters. Then, it is necessary to move the discharge end or position D of feeder 64 along the length of feeding gap 68 so that this discharge end D will be at the proper radial location relative to the peripheral size of each ring-like die 26 used in the thread rolling machine 12. Here, there is disclosed means adjustably connecting the inlet ends or rail portions 69a and 70a with the outlet ends or rail portions 69b and 70b for endwise movement along the length of feeding gap 68 so that discharge position D on rail portions 69b and 70b will be at the proper radial location relative to the periphery of each die 26. Rail portions 69a and 70a are held against substantial longitudinal movement during this adjustment by pivot pin 99, feeder base 67, springs 80 and 81, and U-brackets 71 in FIG. 1. This endwise adjustment is provided by the structure shown in FIGS. 1, 6 and 7. As mentioned before, screw 78 is in horizontally elongated slot 69d in FIG. 6 and the shank of bolt 76 is in horizontally elongated slot 70d in FIG. 7. As rail portions 69b and 70b are moved endwise to telescope into or out of rail portions 69a and 70a, the rail portions 69b and 70b carry with them during this movement screws 78 in FIGS. 1 and 6, bracket 72, sleeve bolt 74 in FIG. 7, and bolt 76. Before this movement can take place, bolt 76 in FIG. 7 is loosened, and a suitable wrench, such as an Allen head wrench, is inserted through each slot 70d in rail portion 70a and hole 70s in rail portion 70b into the recessed engagement hole in the head of each screw 78, such as a recessed hexagonal bore in an Allen head screw, to loosen each screw 78. Then, this relative endwise adjustment between the rail portions may take place, and then bolts 76 and 78 may again be tightened in similar manner.

When articles are fed along gap 68, their heads 10b must drop at the right end of rail portions 69a and 70a in FIG. 1 to a lower level down onto rail portions 69b and 70b. Tapers 69z and 70z on the right end of rail portions 69a and 70a in FIG. 1 permit heads 10b to drop smoothly to this lower level.

Figure 9:
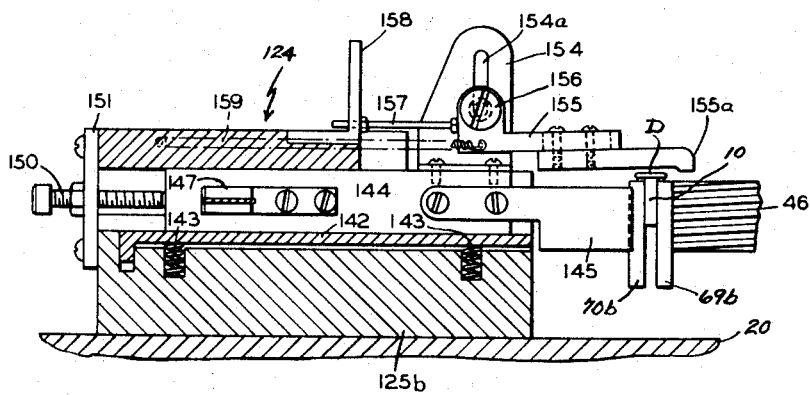
FIG. 9 is a vertical sectional view taken generally along the line 9—9 in FIG. 2.

Since there are two identical article feeders 64, there are also two identical article transfer means 124 serving the respective fixed dies 46 and 46′. Since any suitable transfer means may be used with feeders 64 and since these two means 124 are identical, only one of such means 124 is shown in FIGS. 2, 8 and 9 and will be briefly described. Screw blank or article transfer or feeding means 124 is provided for individually transferring or moving articles 10 individually from discharge position D at the end of feeding gap 68 into a thread rolling position with shank 10a in the thread rolling gap between dies 26 and 46 provided by corner 46a of die 46 and the leading corner of die segment 26a during clockwise rotation in the direction of the arrow in FIG. 2, and article head 10b on top of the dies 26 and 46. Each feeding means 124 including a reciprocable slide and feed finger which move horizontally back and forth across discharge position D of feeding gap 68 in synchronization with rotating die ring 26. This feeding finger is retracted by spring means, and advanced by positive action of a leverage system responsive to the coaction of cam follower 43 in FIG. 1 with a cam track with four operating quadrants 41 and four cam rises 42 on cam plate 40 fixed to the top of hub 24 so as to rotate therewith responsive to spindle rotation. The two means 124 have cam follower rolls 43 disposed at diametrically disposed points to contact with this cam track, and, through suitable linkage, to operate the respective feeding slides as cam followers 43 climb cam rises 42.

Each feeding means 124 includes a feed finger base 125 in FIG. 2 of generally L-shaped contour having legs 125a and 125b substantially at right angles to each other. Threaded in hole 125c in and near the end of leg 125a is post 127 protruding above base 125 in FIGS. 2 and 8 upon which is pivotally carried a bell crank lever above leg 125a with this lever comprising arms 128 and 129 working as a rigid unit. Beneath arm 129 and above leg 125a, and likewise pivoted around post 127, is another arm 130. Arms 129 and 130 have respective pins 131 and 132 rigid therewith with these pins connected by strong spring 133. Normally, limited clockwise swinging action in FIG. 2 of crank arms 128 and 129 will produce limited clockwise swinging action of arm 130 responsive to the spring contraction, but if arm 130 is forcibly prevented from moving by improper action of the feed device, or by interposition of some undesired obstacle, arm 130 can remain unmoved while the crank arms 128 and 129 merely flex spring 133.

Post 134 in table 20 is connected to post 131 by spring 135. The purpose of spring 135 is to return the linkage to momentarily idle position after cam follower 43 drops from a cam rise 41. This fully retracted position is represented by contact of stop lug 138 on arm 129 with stop stud 139 in lug 140 fixed to arm 130.

Base 125 is provided in FIG. 8 with vertically extending flange 125c capped by plate 141 having retaining bead 141a. Base 125 beneath the overhang of cap 141 has groove 125d within which is located pressure plate 142 urged upwardly by springs 143 in FIG. 9. Retained between cap 141 and pressure plate 142 is slide bar 144 having attached to its front end feed finger 145. Slide 144 and finger 145 are shown in retracted position in FIG. 9 with the front end of finger 145 being in registry with the ends of feeder rail portions 69b and 70b, and article 10 is seen in discharge position D ready to be carried to the right in FIG. 9 into operative contact with die 46 by appropriate advance to the right of slide 144 and finger 145.

Slide 144 is advanced by lever arm 130 as follows. The slide has attached thereto block 147 having lug 148 which is loosely pivotally gripped between arm 130 and lug 149 attached to arm 130 (FIG. 8). Pin 149a extends through arm 130, lug 149 and slot 148a. Lost motion slot 148a in lug 148 permits loose attachment to arm 130 whereby to allow for variation of distance of lug 148 from the center of rotation at post 127. Stud 150, fixed to plate 151 on the rear end of the feed finger base 125 (FIG. 9), can be adjustably set to provide a rear stop for slide 144.

Bracket 154, fixed on top of the front end of slide 144, has slot 154a in which is vertically adjustable article positioning arm 155 pivotally secured at pivot 156 in slot 154a. Fixed pin 157 attached to upright plate 158 on feed finger base cap 141 is contactable with arm 155, below its pivot 156, when slide 144 is retracted. This results in raising tip 155a of arm 155. When slide 144 is advanced to the right in FIG. 9, however, the arm breaks contact with pin 157 whereupon spring 159 (fixed at one end to cap 141 and at the other end to arm 155 below pivot 156) lowers arm 155 into contact with the top of article head 10b while it is being introduced between die 46 and movable die 26 so as to insure proper positioning of article 10 with the lower surface of its head 10b in contact with the top die surfaces 26t and 46t or 46t′.

The operation of feeder means 124 will be clear from what has been said heretofore. As the article 10 slides down feeding gap 68, they are oriented properly to approach the bottom end or discharge position D of this gap in a vertical, head-up position. Cam plate 40 is so angularly adjusted, for example by means of studs 161 in slots 162 (FIG. 2), that the leading corner of movable die portion 26a is just registering with the entrance corner of fixed die 46 when slide finger 145 advances article 10 between the dies. Rotation of movable die 26 rolls article 10 along between the dies and applies a thread thereto.

Various changes in details and arrangement of parts can be made by one skilled in the art without departing from either the spirit of this invention or the scope of the appended claims.

What is claimed is:

1. An article feeder for feeding articles from an article supply to an article discharge position wherein each article has at one end of a shank a head of larger cross sectional dimension than said shank, said feeder including a feeder base, two parallel rails with a feeding gap therebetween wider than said shank but narrower than said head to support each article by its head during feeding along said feeding gap, and including rail vibrating means comprising resilient means operatively connecting said rails and feeder base, including force-applying means on said feeder base for exerting a periodic generally endwise force on said rails to move said rails from one position to another against the bias of said resilient means with said resilient means moving said rails back to said one position upon periodic release of said force so that said articles are fed along said feeding gap toward said discharge position; a pivot connecting said feeder base to said mounting base for relative movement of said discharge position toward and away from said mounting base about a horizontal axis; adjustable means for maintaining said bases in any desired pivotal adjustment, said resilient means including a plurality of leaf springs spaced along the length of said rails with each leaf spring connected at opposite ends respectively to said rails and feeder base, said force-applying means including a periodically energized electromagnet, said pivot being located on the opposite side of the center of gravity of said feeder from said discharge position, said adjustable means including a vertically extending adjustment screw located between said pivot and discharge position and screwed into one of said bases and bearing against the other of said bases, feeder loading means for feeding said articles from said supply in a downward direction onto said feeding gap at a loading position so that gravity and said vibration promote dropping of the shanks of said articles into said feeding gap to orient said articles, said loading means including a V-shaped trough having its lower, discharge end straddling said feeding gap to funnel the articles in said trough into said gap, and including a barrel-type article pick-up rotatably driven about a horizontal axis to pick-up said articles from said supply and drop them into said trough; the tops of said rails spaced toward the discharge position from said trough being downwardly and outwardly tapered at a clearing position for clearing said rails of any article not adapted to move into feeding position in said feeding gap; a stationary article guide located above said feeding gap between said clearing position and discharge position for coacting during feeding with the heads of said articles in said feeding gap; each rail having a lip for supporting said article head, each lip being thin along the axial length of said article shanks in said feeding gap and each rail being undercut away from said shank below its lip so that this undercut provides clearance for preventing article crossing or jamming and so that each article is individually hung by gravity from said rail lips by its head.

2. An article feeder for feeding articles from an article supply to an article discharge position wherein each article has at one end of a shank a head of larger cross sectional dimension than said shank, said feeder includnig a feeder base, two parallel rails with a feeding gap therebetween wider than said shank but narrower than said head to support each article by its head during feeding along said feeding gap, and including rail vibrating means comprising resilient means operatively connecting said rails and feeder base, including force-applying means on said feeder base for exerting a periodic generally endwise force on said rails to move said rails from one position to another against the bias of said resilient means with said resilient means moving said rails back to said one posiiton upon periodic release of said force so that said articles are fed along said feeding gap toward said discharge position; a pivot connecting said feeder base to said mounting base for relative movement of said discharge position toward and away from said mounting base about a horizontal axis; adjustable means for maintaining said bases in any desired pivotal adjustment, said resilient means including a plurality of leaf springs spaced along the length of said rails with each leaf spring connected at opposite ends respectively to said rails and feeder base, said force-applying means including a periodically energized electromagnet, said pivot being located on the opposite side of the center of gravity of said feeder from said discharge position, said adjustable means including a vertically extending adjustment screw located between said pivot and discharge position and screwed into one of said bases and bearing against the other of said bases, said stationary article guide being located above said feeding gap for coacting with the heads of said articles during feeding, and means for vibrating at least one of said rails generally longitudinally along the length of said feeding gap to feed said articles along said gap.

References Cited in the file of this patent

UNITED STATES PATENTS

| | | |
|---|---|---|
| 289,023 | Packard | Nov. 27, 1883 |
| 580,589 | Woodward | Apr. 13, 1897 |
| 1,584,264 | Wilcox | May 11, 1926 |
| 1,929,146 | Lidberg | Oct. 3, 1933 |
| 2,065,066 | Freter et al. | Dec. 22, 1936 |
| 2,065,319 | Lewis | Dec. 22, 1936 |
| 2,100,878 | Shallock | Nov. 30, 1937 |
| 2,321,548 | Hanneman | June 8, 1943 |
| 2,332,600 | Rapp | Oct. 26, 1943 |
| 2,385,141 | Kuehlman | Sept. 18, 1945 |
| 2,531,099 | Anderson | Nov. 21, 1950 |
| 2,666,349 | Batchelder | Jan. 19, 1954 |
| 2,764,351 | Broscomb et al. | Sept. 25, 1956 |
| 2,819,788 | Howard | Jan. 14, 1958 |
| 2,825,489 | Batchelder | Mar. 4, 1958 |

FOREIGN PATENTS

| | | |
|---|---|---|
| 123,978 | Switzerland | Mar. 16, 1928 |